(12) United States Patent
Liu

(10) Patent No.: US 8,403,545 B2
(45) Date of Patent: Mar. 26, 2013

(54) ILLUMINATION DEVICE AND ELECTRONIC DEVICE USING THE SAME

(75) Inventor: Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 322 days.

(21) Appl. No.: 12/894,182

(22) Filed: Sep. 30, 2010

(65) Prior Publication Data

US 2012/0039080 A1    Feb. 16, 2012

(30) Foreign Application Priority Data

Aug. 12, 2010   (CN) .......................... 2010 1 0251819

(51) Int. Cl.
*F21V 19/00* (2006.01)
(52) U.S. Cl. ..................................................... 362/382
(58) Field of Classification Search .................. 362/382
See application file for complete search history.

(56) References Cited

U.S. PATENT DOCUMENTS

| | | | | |
|---|---|---|---|---|
| 3,904,843 | A | * | 9/1975 | Kendechy ..................... 200/332 |
| 4,378,473 | A | * | 3/1983 | Noorigian ................ 191/12.2 R |
| 6,161,943 | A | * | 12/2000 | Chang ............................. 362/258 |
| 6,896,395 | B2 | * | 5/2005 | McKenzie et al. ............. 362/490 |
| 2006/0055559 | A1 | * | 3/2006 | Leonard ..................... 340/908.1 |

* cited by examiner

*Primary Examiner* — Evan Dzierzynski
(74) *Attorney, Agent, or Firm* — Altis Law Group, Inc.

(57) ABSTRACT

An illumination device includes a shell, a hub, a conductive cable, a partition plate, a resilient member, a cover, and a lamp. The hub is rotatably secured within the shell. The conductive cable is wound around the hub. The partition plate is fastened to and rotatable together with the hub. The cover covers the shell. The resilient member is latched between the partition plate and the cover. The lamp connects with the conductive cable.

18 Claims, 5 Drawing Sheets

ILLUMINATION DEVICE AND ELECTRONIC DEVICE USING THE SAME

BACKGROUND

1. Technical Field

The present disclosure relates to illumination devices and, particularly, to an illumination device fixed to an electronic device.

2. Description of Related Art

Oftentimes, electronic components such as hard disks need to be removed from the interior of electronic devices, for repair or replacement. However, the interior areas of such devices are often inadequately lit, making such operations difficult and time consuming.

Therefore, an illumination device is desired to overcome the limitations described.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
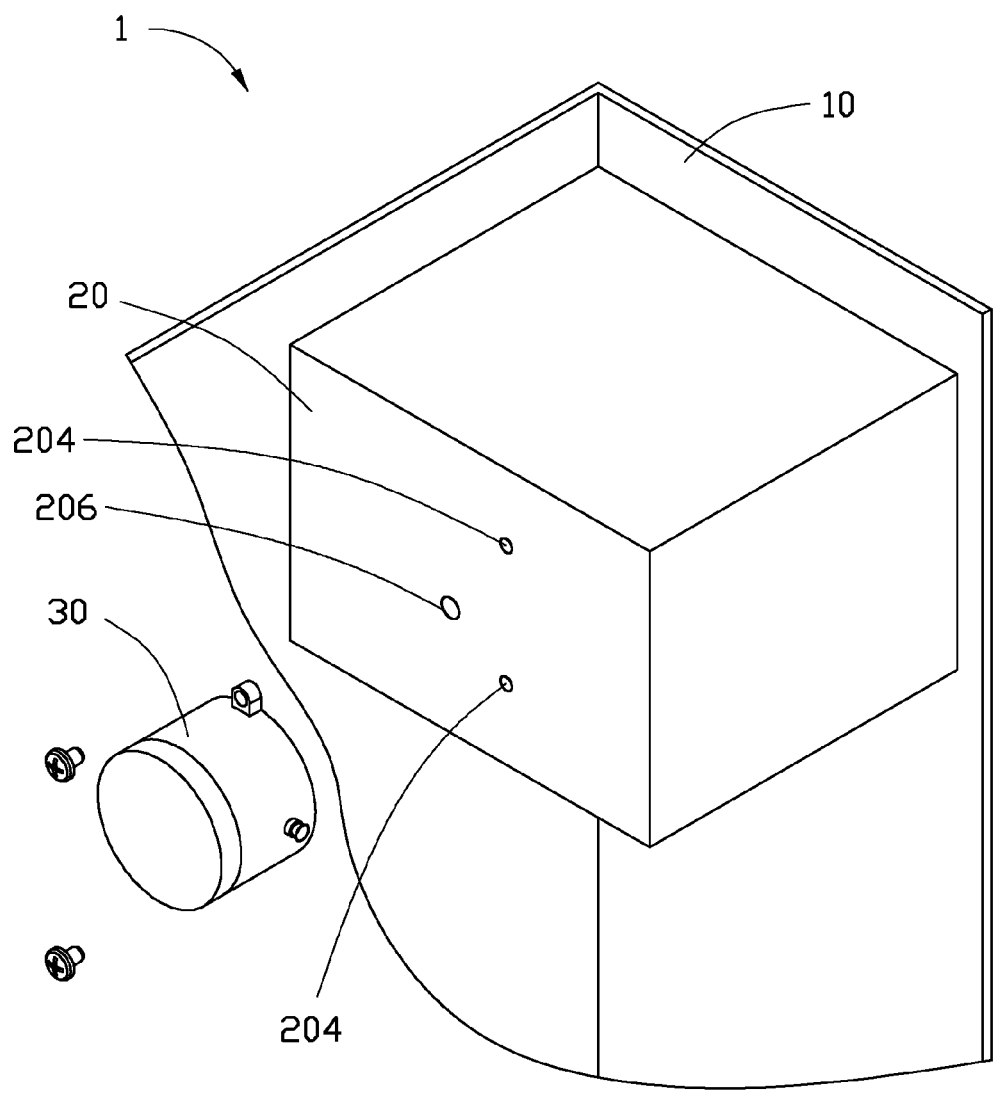
FIG. 1 is an isometric view of an illumination device according to an exemplary embodiment applied with a housing and a power supply.

Referring to FIG. 1, an electronic device 1, according to an exemplary embodiment, is shown. The electronic device 1 includes a housing 10, a power supply 20 mounted within the housing 10, and an illumination device 30 fixed to the power supply 20. The power supply 20 defines a pair of first through holes 204 and a second through hole 206 thereon. In the illustrated embodiment, the electronic device 1 is a computer, and the electronic device 1 is shown as a part of the computer.

Figure 2:
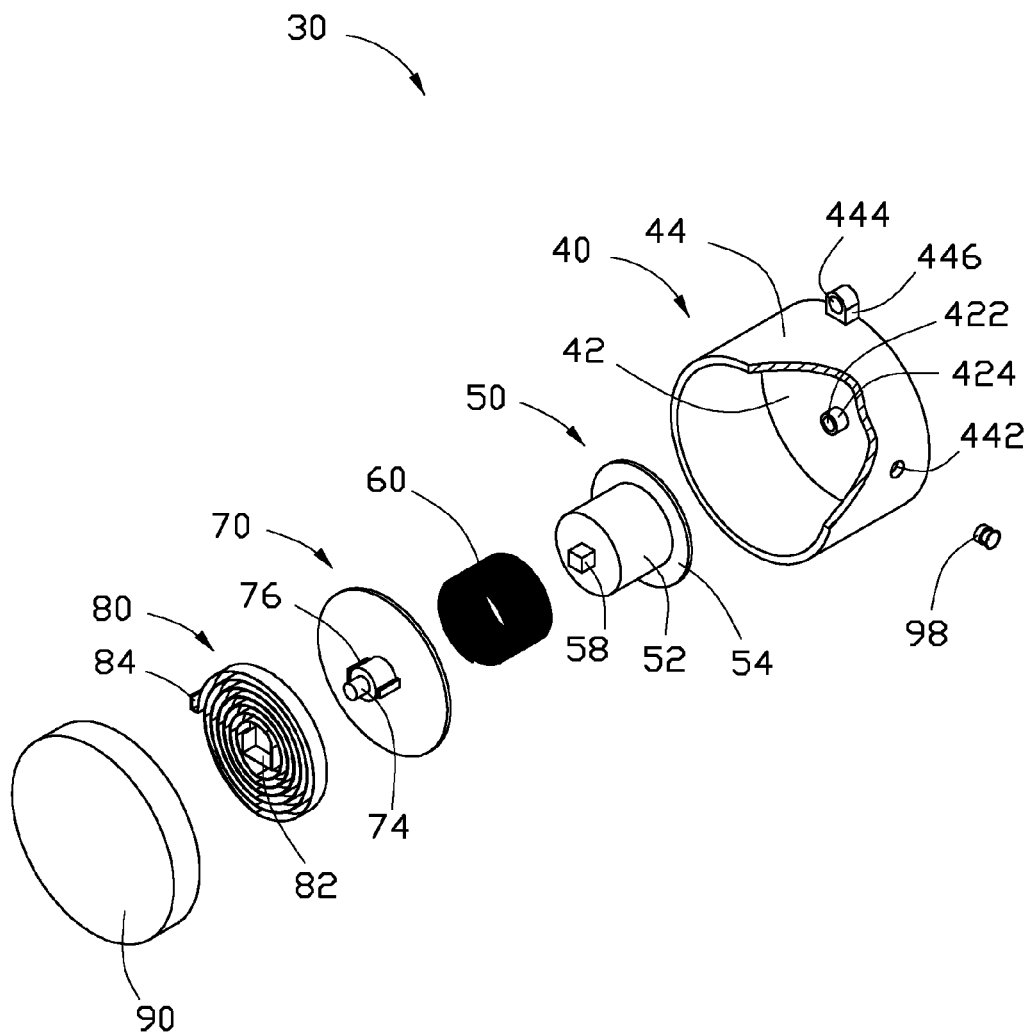
FIG. 2 is an exploded, isometric view of the illumination device of FIG. 1.
Figure 3:
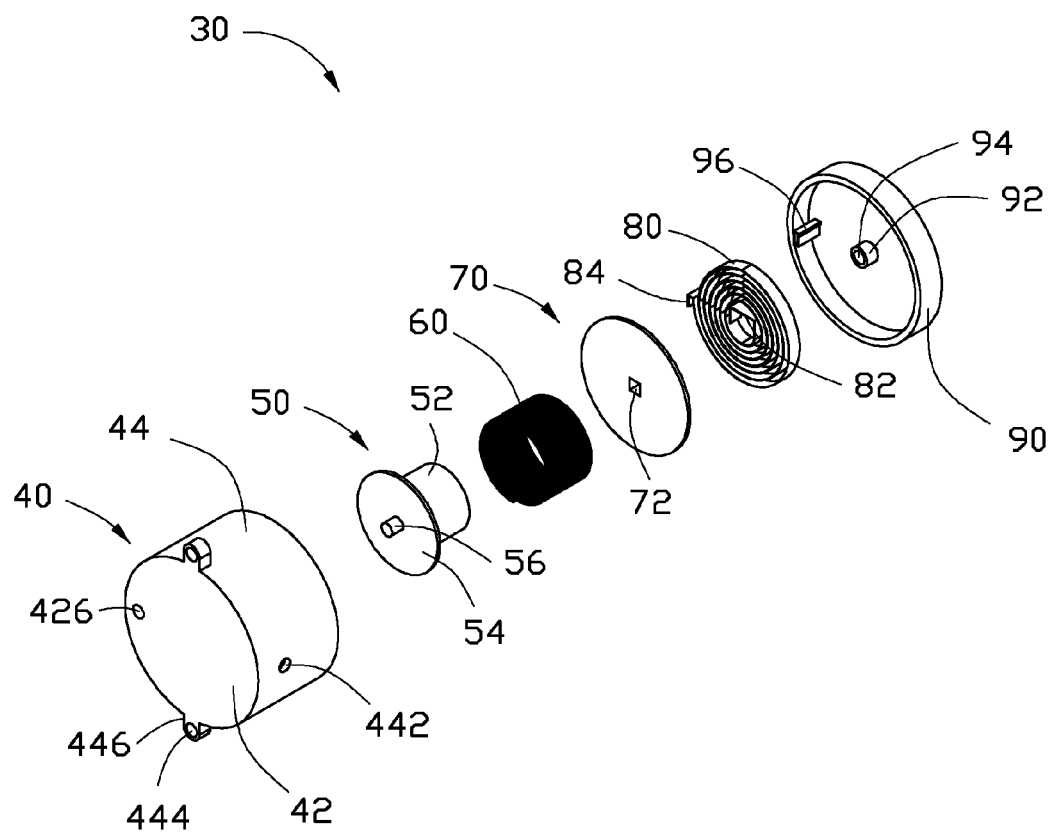
FIG. 3 is an exploded, isometric view of FIG. 2, but viewed from another aspect.
Figure 4:
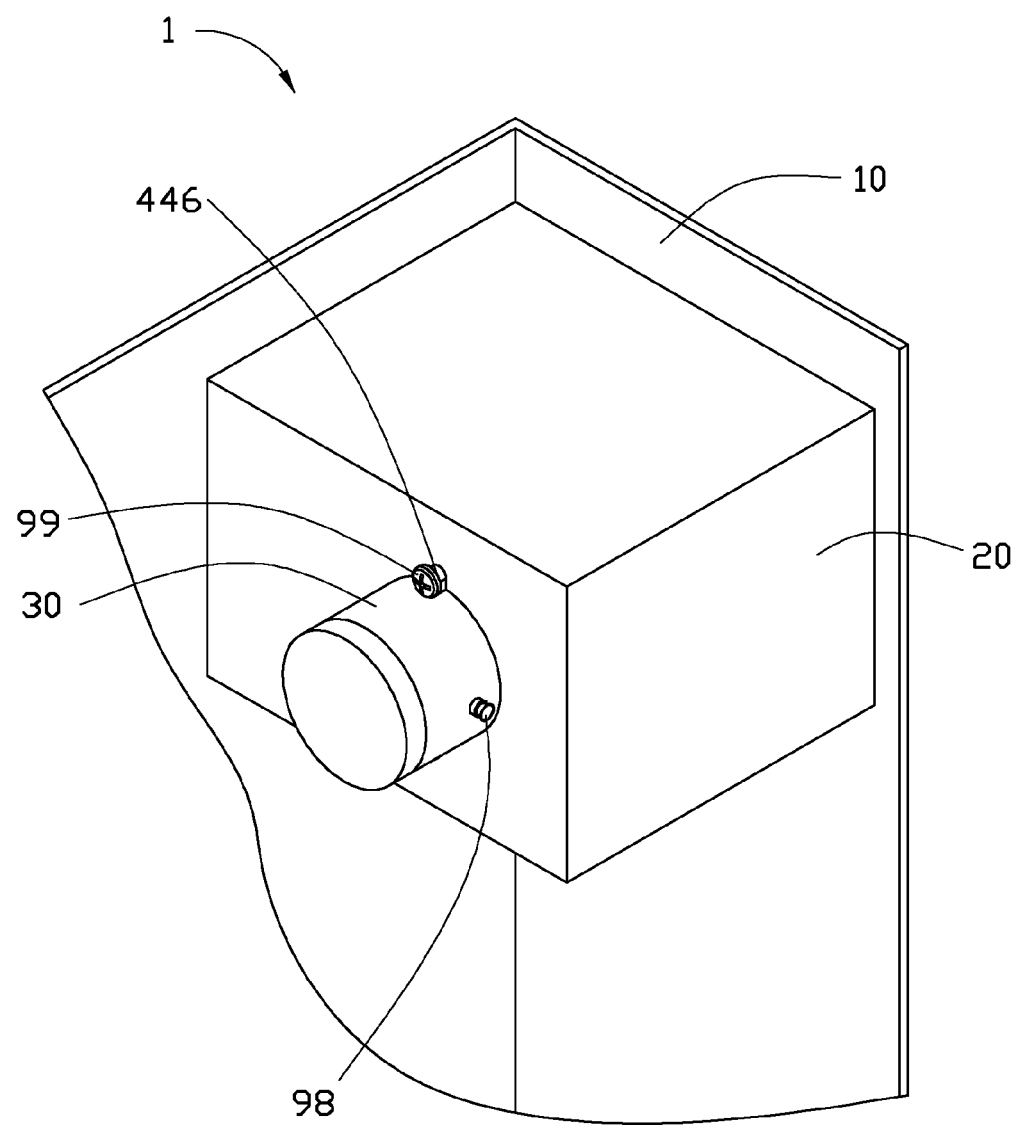
FIG. 4 is an assembled, isometric view of FIG. 1.

Referring to FIGS. 2-3, the illumination device 30 includes a hollow shell 40, a hub 50 rotatably secured within the shell 40, a conductive cable 60 wound around the hub 50, a partition plate 70 fastened to and rotatable together with the hub 50, a cover 90 covering the shell 40, a resilient member 80 latched between the partition plate 70 and the cover 90, and a lamp 98 electrically connected with one end of the conductive cable 60. The other end of the conductive cable 60 is electrically connected with the power supply 20.

The shell 40 includes a bottom surface 42, and an annular sidewall 44 extending from a periphery of the bottom surface 42. The bottom surface 42 includes a first post 424 extending from the center of the bottom surface 42, a first pin hole 422 defined in the first post 424, and a first cable port 426 defined in the bottom surface 42. The annular sidewall 44 includes a pair of assembly portions 446 extending from an outer side of the annular sidewall 44 and adjacent to the bottom surface 42, and a second cable port 442 defined in the annular sidewall 44. An assembly hole 444 is defined in each of the pair of assembly portions 446. The shell 40 is cylindrical.

The hub 50 includes a main body 52, a plate 54 fixed on one end of the main body 52, a first pin 56 protruding vertically from the plate 54 and away from the main body 52, and a second pin 58 protruding vertically from the other end of the main body 52. The main body 52 is cylindrical. A diameter of the plate 54 exceeds a diameter of the main body 52. The first pin 56 corresponds to the first pin hole 422 of the bottom surface 42.

The partition plate 70 includes a second pin hole 72 defined in one end of the partition plate 70, and a shaft 74 extending from the other end of the partition plate 70. The second pin hole 72 corresponds to the second pin 58 of the hub 50. An outer sidewall of the shaft 74 includes two holding arms 76.

The resilient member 80 includes a first fixed end 82 and a second fixed end 84.

The cover 90 includes a second post 92 extending from the center of an inner side of the cover 90, a shaft hole 94 defined in the second post 92, and a fixed portion 96 fixed on the inner side of the cover 90. The shaft hole 94 corresponds to the shaft 74 of the partition plate 70. The fixed portion 96 corresponds to the second fixed end 84 of the resilient member 80.

Referring to FIGS. 1-4, during assembly of the hub 50 to the shell 40, the hub 50 is rotatably received in the shell 40 by the first pin 56 of the hub 50 passing through the first pin hole 422 of the first post 424 of the shell 40.

During assembly of the conductive cable 60 to the hub 50, the conductive cable 60 is wound around the main body 52 of the hub 50, and two ends of the conductive cable 60 pass through the first cable port 426 and the second cable port 442 respectively.

During assembly of the partition plate 70 to the hub 50, the partition plate 70 is fixed to the hub 50 by the second pin 58 of the hub 50 received in the second pin hole 72 of the partition plate 70.

During assembly of the resilient member 80 to the hub 70, the resilient member 80 is fixed to the partition plate 70 by the first fixed end 82 of the resilient member 80 being received between the shaft 74 and the two holding arms 76.

During assembly of the cover 90 to the resilient member 80, the partition plate 70, and the shell 40, the cover 90 covers the shell 40, the cover 90 is fixed to the resilient member 80 by the second fixed end 84 of the resilient member 80 being fixed to the fixed portion 96, and the partition plate 70 is rotatably received in the cover 90 by the shaft 74 of the partition plate 70 passing through the shaft hole 94 of the second post 92 of the cover 90.

The lamp 98 electrically connects with the one end of the conductive cable 60 through the second cable port 442. The other end of the conductive cable 60 is electrically connected with the power supply 20 through the first cable port 426 and the second through hole 206 of the power supply 20. The illumination device 30 and the power supply 20 can be secured to each other by a plurality of connecting members 99 each running through the assembly hole 444 of the annular sidewall 44 and one of the pair of first through holes 204 of the power supply 20.

Figure 5:
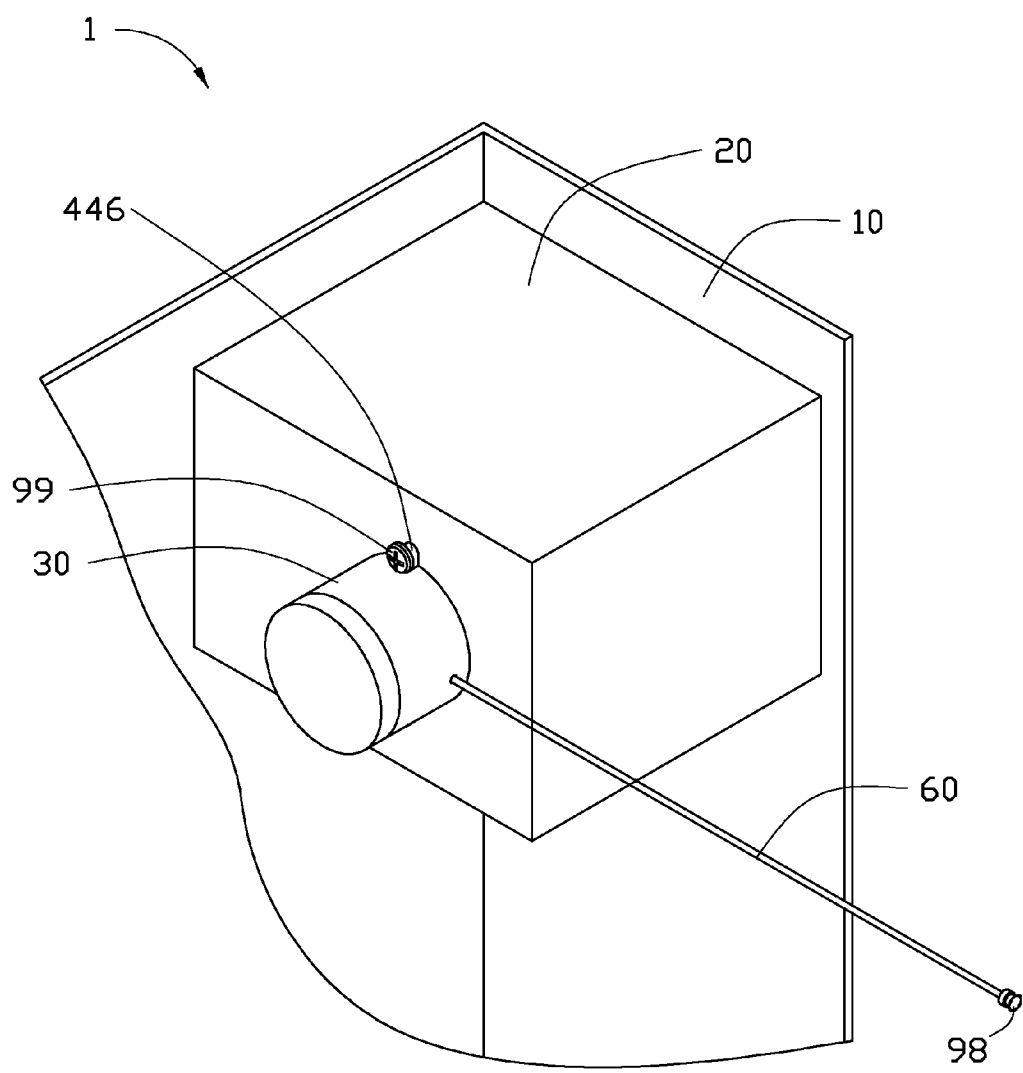
FIG. 5 is an assembled, isometric view of FIG. 1 showing a lamp with a conductive cable extended.

Referring to FIG. 5, when components of the electronic device 1 must be repaired or replaced, the lamp 98 with the conductive cable 60 is pulled up and the hub 50 and the partition plate 70 rotate, deforming the resilient member 80, and the lamp 98 easily illuminates the components of the electronic device 1. However, when the lamp 98 is not in use, the resilient member 80 provides a force to rotate the hub 50 and the partition plate 70, and the lamp 98 with the conductive cable 60 being pulled back.

While the disclosure has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An illumination device comprising:
a hollow shell comprising a bottom surface, wherein the bottom surface comprises a first post extending from the center of the bottom surface, and a first pin hole defined in the first post;
a hub comprising a first pin rotatably received in the first pin hole, thereby being rotatably secured within the shell;
a conductive cable wound around the hub;
a partition plate fastened to and rotatable together with the hub;
a cover covering the shell;
a resilient member latched between the partition plate and the cover; and
a lamp electrically connected with the conductive cable.

2. The illumination device of claim 1, wherein the shell is cylindrical, and an annular sidewall extends from a periphery of the bottom surface.

3. The illumination device of claim 2, wherein the annular sidewall comprises a pair of assembly portions extending from an outer side of the annular sidewall.

4. The illumination device of claim 2, wherein the bottom surface defines a first cable port therein, and the annular sidewall defines a second cable port therein, and wherein the lamp electrically connects with one end of the conductive cable through the second cable port.

5. The illumination device of claim 1, wherein the cover comprises a second post extending from the center of an inner side of the cover, and a shaft hole defined in the second post; and wherein the partition plate comprises a shaft received in the shaft hole.

6. The illumination device of claim 5, wherein the partition plate further comprises a second pin hole defined in one end of the partition plate; wherein the shaft of the partition plate extends from the other end of the partition plate; and wherein the hub further comprises a second pin received in the second pin hole.

7. The illumination device of claim 6, wherein the hub further comprises a main body, and a plate fixed on the main body, a diameter of the plate exceeds a diameter of the main body; and wherein the conductive cable is wound around the main body of the hub.

8. The illumination device of claim 5, wherein an outer sidewall of the shaft of the partition plate comprises two holding arms; and wherein the resilient member comprises a first fixed end and a second fixed end, and wherein the first fixed end is fixedly received between the shaft and the two holding arms.

9. The illumination device of claim 8, wherein the cover further comprises a fixed portion fixed on the inner side of the cover and fixing the second fixed end.

10. An electronic device comprising:
a housing;
a power supply mounted within the housing; and
an illumination device fixed to the power supply, wherein the illumination device comprises:
a hollow shell comprising a bottom surface, wherein the bottom surface comprises a first post extending from the center of the bottom surface, and a first pin hole defined in the first post;
a hub comprising a first pin received in the first pin hole, to be rotatably secured within the shell;
a conductive cable wound around the hub;
a partition plate fastened to and rotatable together with the hub;
a cover covering the shell;
a resilient member latched between the partition plate and the cover; and
a lamp electrically connected to one end of the conductive cable, and the other end of the conductive cable electrically connected to the power supply.

11. The electronic device of claim 10, wherein the shell is cylindrical, and an annular sidewall extends from a periphery of the bottom surface.

12. The electronic device of claim 11, wherein the annular sidewall comprises a pair of assembly portions extending from an outer side of the annular sidewall.

13. The electronic device of claim 11, wherein the bottom surface defines a first cable port therein, and the annular sidewall defines a second cable port therein, and wherein the lamp electrically connects with one end of the conductive cable through the second cable port, and the other end of the conductive cable is electrically connected with the power supply through the first cable port.

14. The electronic device of claim 10, wherein the cover comprises a second post extending from the center of an inner side of the cover, and a shaft hole defined in the second post; and wherein the partition plate comprises a shaft received in the shaft hole.

15. The electronic device of claim 14, wherein the partition plate further comprises a second pin hole defined in one end of the partition plate; wherein the shaft of the partition plate extends from the other end of the partition plate; and wherein the hub further comprises a second pin received in the second pin hole.

16. The electronic device of claim 15, wherein the hub further comprises a main body and a plate fixed on the main body, a diameter of the plate exceeds a diameter of the main body; and wherein the conductive cable is wound around the main body of the hub.

17. The electronic device of claim 14, wherein an outer sidewall of the shaft of the partition plate comprises two holding arms; and wherein the resilient member comprises a first fixed end and a second fixed end, and wherein the first fixed end is fixedly received between the shaft and the two holding arms.

18. The electronic device of claim 17, wherein the cover further comprises a fixed portion fixed on the inner side of the cover and fixing the second fixed end.

\* \* \* \* \*